(12) United States Patent
Samaras (10) Patent No.: US 11,300,978 B1
(45) Date of Patent: Apr. 12, 2022

(54) SYSTEM, METHOD, AND COMPUTER PROGRAM PRODUCT FOR TRANSPORTING AN UNMANNED VEHICLE

(71) Applicant: Carnegie Mellon University, Pittsburgh, PA (US)

(72) Inventor: Constantinos Samaras, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 314 days.

(21) Appl. No.: 16/505,995

(22) Filed: Jul. 9, 2019

Related U.S. Application Data (60) Provisional application No. 62/763,925, filed on Jul. 9, 2018.

(51) Int. Cl.
| | |
|---|---|
| *G05D 1/12* | (2006.01) |
| *G05D 1/02* | (2020.01) |
| *G05D 1/10* | (2006.01) |
| *B64C 39/02* | (2006.01) |
| *G06Q 20/10* | (2012.01) |
| *B60P 3/11* | (2006.01) |

(52) U.S. Cl.
CPC ............ *G05D 1/12* (2013.01); *B60P 3/11* (2013.01); *B64C 39/024* (2013.01); *G05D 1/021* (2013.01); *G05D 1/101* (2013.01); *G06Q 20/10* (2013.01); *B64C 2201/027* (2013.01); *B64C 2201/208* (2013.01)

(58) Field of Classification Search
CPC .......... G05D 1/12; G05D 1/101; G05D 1/021; B60P 3/11; G06Q 20/10; B64C 39/024; B64C 2201/027; B64C 2201/208
See application file for complete search history.

(56) References Cited

U.S. PATENT DOCUMENTS

| | | | |
|---|---|---|---|
| 9,481,757 B2* | 11/2016 | Gan | C08G 59/226 |
| 9,704,409 B2* | 7/2017 | Prakash | B64C 39/024 |
| 9,841,757 B2* | 12/2017 | Mikan | G08G 5/0069 |
| 10,134,290 B2* | 11/2018 | Mikan | G08G 5/0069 |
| 2015/0370251 A1* | 12/2015 | Siegel | G05D 1/00 701/2 |
| 2016/0196756 A1* | 7/2016 | Prakash | G08G 5/025 701/3 |
| 2016/0364989 A1* | 12/2016 | Speasl | G08G 5/0082 |
| 2017/0038780 A1* | 2/2017 | Fandetti | G06Q 10/083 |
| 2017/0313421 A1* | 11/2017 | Gil | B64F 1/32 |
| 2019/0039731 A1* | 2/2019 | Marcath | B64F 1/007 |
| 2019/0047462 A1* | 2/2019 | Vijayaraghavan | B60W 30/00 |

(Continued)

*Primary Examiner* — Richard M Camby
(74) *Attorney, Agent, or Firm* — The Webb Law Firm (57) ABSTRACT

A method, system, and computer program product is provided for transporting an unmanned vehicle to a destination location. The method includes determining a ground vehicle from a plurality of ground vehicles based on a location of the ground vehicle, the destination location, and a location of the unmanned vehicle, controlling the unmanned vehicle to the location of the ground vehicle, controlling at least one attachment mechanism to attach the unmanned vehicle to the ground vehicle, in response to the ground vehicle traveling to a second location, controlling the at least one attachment mechanism to detach the unmanned vehicle from the ground vehicle, and controlling the unmanned vehicle to the destination location.

18 Claims, 7 Drawing Sheets

(56) References Cited

U.S. PATENT DOCUMENTS

2019/0161190 A1\* 5/2019 Gil .......................... G01S 19/15
2019/0344679 A1\* 11/2019 Miller .................... B60L 8/003
2020/0166929 A1\* 5/2020 Jiwani .................. G05D 1/0055

\* cited by examiner

FIG. 7

SYSTEM, METHOD, AND COMPUTER PROGRAM PRODUCT FOR TRANSPORTING AN UNMANNED VEHICLE

CROSS-REFERENCE TO RELATED APPLICATION

This application claims priority to U.S. Provisional Patent Application No. 62/763,925, filed Jul. 9, 2018, the disclosure of which is hereby incorporated by reference in its entirety.

GOVERNMENT LICENSE RIGHTS

This invention was made with Government support under Department of Energy Grant No. DE-EE0008463. The Government has certain rights in the invention.

BACKGROUND

1. Field

This disclosure relates generally to vehicle parking spaces and unmanned vehicles and, in non-limiting embodiments, systems, methods, and computer program products for transporting an unmanned vehicle and managing a plurality of vehicle parking spaces.

2. Technical Considerations

There is an increasing interest in using unmanned vehicles, such as aerial or ground drones, to effectuate deliveries. Limited battery or fuel capacity, availability in network connectivity, weather conditions, and other elements may affect the ability of an unmanned vehicle to reach a destination location. Moreover, limitations on physical space and traffic flow considerations make deliveries difficult for both ground and aerial vehicles. Especially in urban environments or other environments with a high throughput of people and vehicles, vehicles transporting people or goods for delivery face difficulties finding temporary locations to park or may be prohibited from dropping off and/or picking up passengers and/or goods while in travel lanes or non-designated areas.

SUMMARY

According to non-limiting embodiments or aspects, provided is a method for transporting an unmanned vehicle to a destination location, comprising: determining, with at least one processor, a ground vehicle from a plurality of ground vehicles based on a location of the ground vehicle, the destination location, and a location of the unmanned vehicle; transmitting a transportation request to a computing device associated with the ground vehicle; receiving, from the computing device associated with the ground vehicle, an acceptance message in response to the transportation request; in response to receiving the acceptance message, controlling, with at least one processor, the unmanned vehicle to the location of the ground vehicle; controlling, with at least one processor, at least one attachment mechanism to attach the unmanned vehicle to the ground vehicle; in response to the ground vehicle traveling to a second location, controlling, with at least one processor, the at least one attachment mechanism to detach the unmanned vehicle from the ground vehicle; and controlling, with at least one processor, the unmanned vehicle to the destination location.

In non-limiting embodiments or aspects, at least one processor arranged in the unmanned vehicle determines the ground vehicle from the plurality of ground vehicles, transmits the transportation request to the computing device associated with the ground vehicle, receives the acceptance message, controls the unmanned vehicle, and controls the at least one attachment mechanism. In non-limiting embodiments or aspects, at least one processor of a remote server computer determines the ground vehicle from the plurality of ground vehicles, transmits the transportation request to the computing device associated with the ground vehicle, receives the acceptance message, and causes the unmanned vehicle to travel. In non-limiting embodiments or aspects, the at least one attachment mechanism comprises a first mechanism arranged on the unmanned vehicle and a second mechanism arranged on the ground vehicle. In non-limiting embodiments or aspects, the method further comprises transferring at least one unit of credit from an electronic account associated with the unmanned vehicle to an electronic account associated with the ground vehicle in response to the ground vehicle traveling to the second location. In non-limiting embodiments or aspects, the ground vehicle is determined based on a planned route of the ground vehicle. In non-limiting embodiments or aspects, the ground vehicle is determined from a subset of ground vehicles within a first distance of the unmanned vehicle. In non-limiting embodiments or aspects, the ground vehicle is determined based on a plurality of bids from a plurality of computing devices associated with a subset of ground vehicles of the plurality of ground vehicles. In non-limiting embodiments or aspects, the attachment mechanism comprises at least one of a magnet and a physical locking arrangement. In non-limiting embodiments or aspects, the unmanned vehicle comprises a first power connection and the ground vehicle comprises a second power connection, and wherein attaching the unmanned vehicle to the ground vehicle comprises establishing electrical communication between the first power connection and the second power connection.

According to non-limiting embodiments or aspects, provided is a system for transporting an unmanned vehicle to a destination location, comprising at least one processor programmed or configured to: determine a ground vehicle from a plurality of ground vehicles based on the location of the ground vehicle, the destination location, and a location of the unmanned vehicle; transmit a transportation request to a computing device associated with the ground vehicle; receive, from the computing device associated with the ground vehicle, an acceptance message in response to the transportation request; and generate at least one command configured to cause the unmanned vehicle to travel to the location of the ground vehicle and attach to the ground vehicle.

In non-limiting embodiments or aspects, the system further comprises a server computer including the at least one processor and arranged remotely from the unmanned vehicle and ground vehicle, the at least one processor further programmed or configured to transmit the at least one command to the unmanned vehicle. In non-limiting embodiments or aspects, the system further comprises the unmanned vehicle, the unmanned vehicle comprises the at least one processor. In non-limiting embodiments or aspects, the system further comprises at least one attachment mechanism arranged on at least one of the unmanned vehicle and the ground vehicle, the at least one attachment mechanism configured to attach the unmanned vehicle to the ground vehicle. In non-limiting embodiments or aspects, the at least attachment mechanism comprises a first mechanism arranged on the unmanned vehicle and a second mechanism arranged on the ground vehicle. In non-limiting embodiments or aspects, the at least one attachment mechanism comprises at least one of a magnet and a physical locking arrangement. In non-limiting embodiments or aspects, the at least one processor is further programmed or configured to: determine that the unmanned vehicle arrived at a second location; and in response to determining that the unmanned vehicle arrived at the second location, detach the unmanned vehicle from the ground vehicle. In non-limiting embodiments or aspects, the ground vehicle is determined based on at least one of the following: a planned route of the ground vehicle, a plurality of bids from a plurality of computing devices associated with a subset of ground vehicles of the plurality of ground vehicles, a distance between the unmanned vehicle and the ground vehicle, or any combination thereof.

According to non-limiting embodiments or aspects, provided is a computer program product for transporting an unmanned vehicle to a destination location, comprising at least one non-transitory computer-readable medium including program instructions that, when executed by at least one processor, cause the at least one processor to: determine a ground vehicle from a plurality of ground vehicles based on the location of the ground vehicle, the destination location, and a location of the unmanned vehicle; transmit a transportation request to a computing device associated with the ground vehicle; receive, from the computing device associated with the ground vehicle, an acceptance message in response to the transportation request; and generate at least one command configured to cause the unmanned vehicle to travel to the location of the ground vehicle and attach to the ground vehicle.

According to non-limiting embodiments or aspects, provided is a method for managing a plurality of vehicle spaces, comprising: receiving, from a computing device associated with a vehicle, a vehicle space request associated with a destination location; determining, based on the vehicle space request, at least two vehicle spaces of a plurality of vehicle spaces based on the vehicle space request, wherein each vehicle space of the at least two vehicle spaces is associated with a cost; transmitting, to the computing device associated with the vehicle, data configured to cause the computing device to display at least one graphical user interface configured to display the cost of each vehicle space of the at least two vehicle spaces and to receive a selection of a vehicle space of the at least two vehicle spaces; receiving, from the computing device associated with the vehicle, the selection of the vehicle space; in response to receiving the selection of the vehicle space, associating at least one of the computing device and the vehicle with the vehicle space and a reservation time period in a reservation database; and monitoring, with at least one camera, the vehicle space to detect a presence of the vehicle in the vehicle space.

In non-limiting embodiments or aspects, determining the at least two vehicle spaces is based on a status of the vehicle space as full, vacant, or reserved. In non-limiting embodiments or aspects, the method further comprises determining the cost of each vehicle space based on a status of a subset of vehicle spaces within a distance of the vehicle space. In non-limiting embodiments or aspects, the method further comprises updating the reservation database in response to detecting the presence of the vehicle.

According to non-limiting embodiments or aspects, provided is a system for managing a plurality of vehicle spaces, comprising: a data storage device comprising a reservation database; and at least one processor in communication with the data storage device, the at least one processor programmed or configured to: receive a vehicle space request from a computing device associated with a vehicle, the vehicle space request associated with a destination location; determine, based on the vehicle space request, at least two vehicle spaces of a plurality of vehicle spaces, wherein each vehicle space of the at least two vehicle spaces is associated with a cost; transmit, to the computing device associated with the vehicle, data configured to cause the computing device to display at least one graphical user interface configured to display the cost of each vehicle space of the at least two vehicle spaces and to receive a selection of a vehicle space of the at least two vehicle spaces; receive, from the computing device associated with the vehicle, the selection of the vehicle space; in response to receiving the selection of the vehicle space, associate at least one of the computing device and the vehicle with the vehicle space and a reservation time period in the reservation database; and detect a presence of the vehicle in the vehicle space based on monitoring data received from at least one detection device.

In non-limiting embodiments or aspects, determining the at least two vehicle spaces is based on a status of the vehicle space as full, vacant, or reserved. In non-limiting embodiments or aspects, the at least one processor is further configured to determine the cost of each vehicle space based on a status of a subset of vehicle spaces within a distance of the vehicle space. In non-limiting embodiments or aspects, the at least one processor is further configured to update the reservation database in response to detecting the presence of the vehicle.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION OF THE PREFERRED EMBODIMENTS

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer or other form of non-mobile computer. An "interface" refers to a generated display, such as one or more graphical user interfaces (GUIs) with which a user may interact, either directly or indirectly (e.g., through a keyboard, mouse, touchscreen, etc.).

As used herein, the terms "server" and "server computer" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or components of systems. For example, an API may include functions, subroutines, and/or the like usable and/or accessible by other systems or other components of systems.

Figure 1:
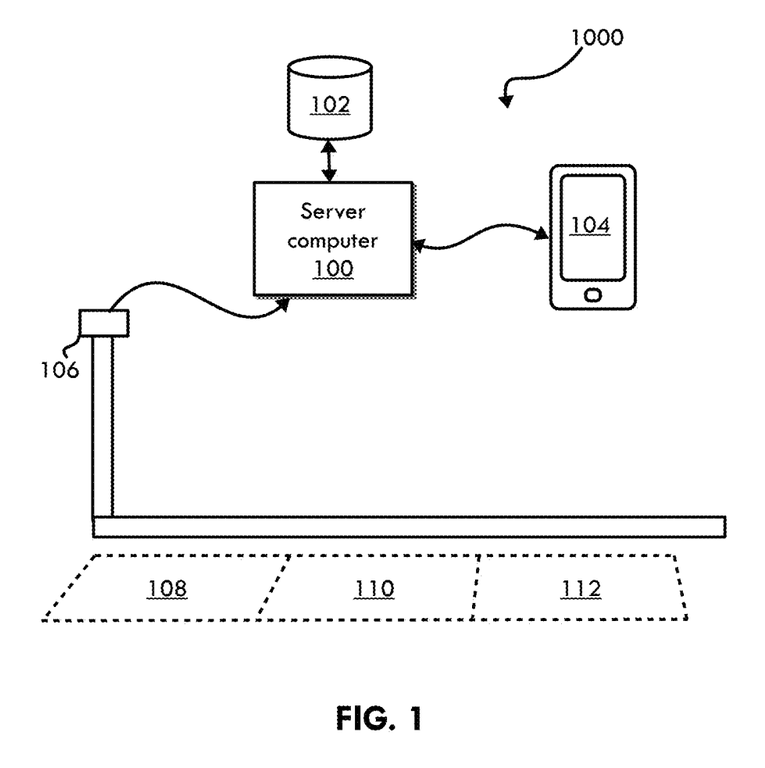
FIG. 1 is a schematic diagram of a system for managing a plurality of vehicle spaces according to a non-limiting embodiment.

Referring now to FIG. 1, a system 1000 for managing a plurality of vehicle spaces is shown according to a non-limiting embodiment. The system includes a server computer 100 in communication with a detection device 106 and a mobile device 104. The detection device 106 may include, for example, one or more cameras arranged to capture images of a plurality of vehicle spaces 108, 110, 112, one or more sensors, or any other system or device for detecting the presence of a vehicle. In the depicted example, the vehicle spaces 108, 110, 112 are arranged in front of a curb for parallel parking although it will be appreciated that various arrangements of vehicle spaces 108, 110, 112 may be used. For example, the vehicle spaces 108, 110, 112 may be located on a street, sidewalk, parking lot, and/or the like. The mobile device 104 may be a computing device operated by a driver of a vehicle, such as a smartphone, vehicle computer, and/or the like. The server computer 100 may also be in communication with a reservations database 102 storing reservation data including vehicles (e.g., vehicle identifiers) associated with reservation dates, times, and vehicle spaces (e.g., vehicle space identifiers).

With continued reference to FIG. 1, the mobile device 104 may communicate a vehicle space request to the server computer 100. The vehicle space request may include one or more packets of data including, for example, a vehicle identifier (e.g., license plate number, registration number, description (e.g., make/model/color), etc.), a device identifier (e.g., IP address, MAC address, etc.), a user identifier, a location (e.g., address or coordinates), a requested reservation time, and/or a requested reservation period. In some examples, rather than sending a requested reservation time, the reservation time may be automatically calculated by the server computer 100 based on a current location of the vehicle, an estimated route distance, and an estimated flow of traffic. In some examples, the vehicle space request may be communicated to the server computer 100 from a different server (not shown in FIG. 1) in communication with the mobile device 104, such as a central dispatch system. In such cases, the mobile device 104 communicates vehicle space request data, which may be a specific request or an indication of a destination, to the other server which generates a vehicle space request and communicates it to the server computer 100. It will be appreciated that other variations are possible. The mobile device 104 may automatically generate and communicate a vehicle space request or, in other examples, may be manually initiated by an operator through one or more GUIs.

Still referring to FIG. 1, in response to receiving the vehicle space request, the server computer 100 may determine at least two vehicle spaces from a plurality of vehicle spaces based on the request. For example, if the vehicle is scheduled to arrive at the destination shown in FIG. 1 at approximately 12:00 PM, the server computer 100 may query the reservations database 102 to identify one or more vehicle spaces at or near the destination that is available at that time. In non-limiting embodiments, a plurality of available vehicle spaces may be determined where each space is associated with a cost. As an example, the cost for each vehicle space may differ based on demand (e.g., real-time or historical), convenience, traffic, distance, and/or the like. The server computer 100 then communicates data to the mobile device 104 that is configured to cause the mobile device 104 to display a GUI including selectable options for choosing a vehicle space from the plurality of available vehicle spaces. In non-limiting embodiments, the GUI may display the cost of each vehicle space. As an example, vehicle space 108 may be associated with a cost of $1 and vehicle space 112 may be associated with a cost of $0.50. In examples in which the vehicle is a rideshare or taxi vehicle, the passenger may have the option of choosing one of the vehicle spaces as a drop-off location such that the passenger has the option of paying more for a more convenient drop-off location or saving on cost by choosing a drop-off location that is a greater distance or inconvenience. In examples in which the vehicle is a food delivery vehicle, the operator of the vehicle may choose a location based on a distance he or she is required to walk to make the final delivery and a cost that the operator is willing to pay for the convenience. In some non-limiting embodiments, one or more rules may be used to automatically select a vehicle space based on threshold ranges of cost and distance, as examples.

With continued reference to FIG. 1, the server computer 100 may receive a selection of an available vehicle space from the mobile device 104 or elsewhere. The server computer 100 may then, in response to receiving the selection, associate a vehicle space with the vehicle and/or mobile device 104 in the reservations database 102. The reservations database 102 may also include an arrival time and a duration, as examples. The detection device 106 monitors the vehicle spaces 108, 110, 112 to determine when a vehicle occupies one of the spaces. The detection device 106 may identify the vehicle based on a vehicle identifier, such as a license plate, and determine whether the vehicle is permissibly parked based on an existing reservation in the reservation database. If the vehicle is not permissibly parked, the server computer 100 may automatically alert a parking enforcement service. In some non-limiting examples, the detection device 106 may detect the presence of the vehicle based on receiving data from the vehicle, such as a wireless radio frequency communication that uniquely identifies the vehicle. In some non-limiting examples, a geolocation of the vehicle may be used to determine if the vehicle is present in one or more of the vehicle spaces 108, 110, 112. The reservation database 102 may be updated based on the monitoring of the vehicle spaces 108, 110, 112.

In non-limiting embodiments, camera detection, object recognition, object classification, and/or scheduling techniques may be used to manage vehicles that need to arrive at a location for delivery, including both ground and aerial vehicles, within public or private rights-of-way. In some examples, the vehicle spaces 108, 110, 112 may be spaces on a sidewalk, street, parking lot, delivery dock, or other location that can be reserved. The detection device 106 may be used to collect visual data for enforcing the reservations of the respective vehicle spaces 108, 110, 112 and for verifying deliveries made by the vehicle. The data from the detection device 106 and the reservation data may be processed by any computing device such as the server computer 100, computing device 104, and/or a computing device local to the destination location (e.g., an edge computing device). Moreover, in embodiments in which the vehicle is an unmanned vehicle, a computing device local to the destination location may take over control of the unmanned vehicle and technically guide the final approach, parking, landing, takeoff, and/or the like.

Figure 2:
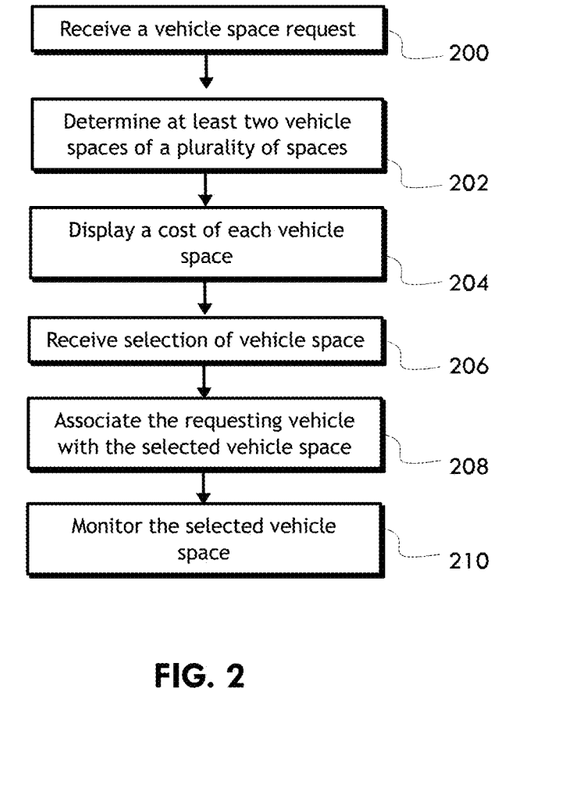
FIG. 2 is a flow diagram of a method for managing a plurality of vehicle spaces according to a non-limiting embodiment.

Referring now to FIG. 2, a flow diagram is shown for a method of managing a plurality of vehicle spaces according to a non-limiting embodiment. It will be appreciated that the steps in FIG. 2 may be performed by one or more computing devices including, but not limited to, a server computer, a mobile device, a computing device on-board an unmanned vehicle, a computing device on-board a ground vehicle, and/or the like. At a first step 200, a vehicle space request is received. The vehicle space request may be received directly from a vehicle, from a mobile device associated with a vehicle, or from a server that is in communication with the vehicle and/or mobile device associated with the vehicle. At a second step 202, at least two spaces of a plurality of vehicle spaces are determined. The at least two spaces may be determined based on a destination location specified in the vehicle space request, a time period specified in the vehicle space request or estimated based on the vehicle location, the vehicle location, and/or other parameters. At step 204, a cost of each vehicle space determined in step 202 is displayed. As an example, one or more selectable options for a user to choose a vehicle space from at least two vehicle spaces is displayed on a GUI of the vehicle and/or a mobile device associated with the vehicle. At step 206, a selection of a vehicle space of the at least two vehicle spaces is received from the vehicle and/or mobile device. The selection may be made by a user or, in other examples, may be automatically made based on predefined rules.

Still referring to FIG. 2, at step 208 the vehicle is associated with the vehicle space in a database. For example, a record may be created in a database that associates an identifier of a vehicle space with a vehicle identifier, a reservation time, and a reservation duration. At step 210, the selected vehicle space is monitored to determine when the vehicle arrives and/or if another vehicle arrives instead. For example, the vehicle space may be monitored with a detection device until a vehicle matching the vehicle identifier is present in the vehicle space. If a vehicle is present in the vehicle space that does not have a reservation (e.g., the vehicle identifier does not match the reservation record), a parking enforcement system may be automatically contacted. For example, a parking enforcement violation or tow request may be automatically generated and transmitted to the relevant authority. Vehicle spaces may also be monitored to update the database with newly-available vehicle spaces such as spaces that are vacated earlier than scheduled.

Figure 3:
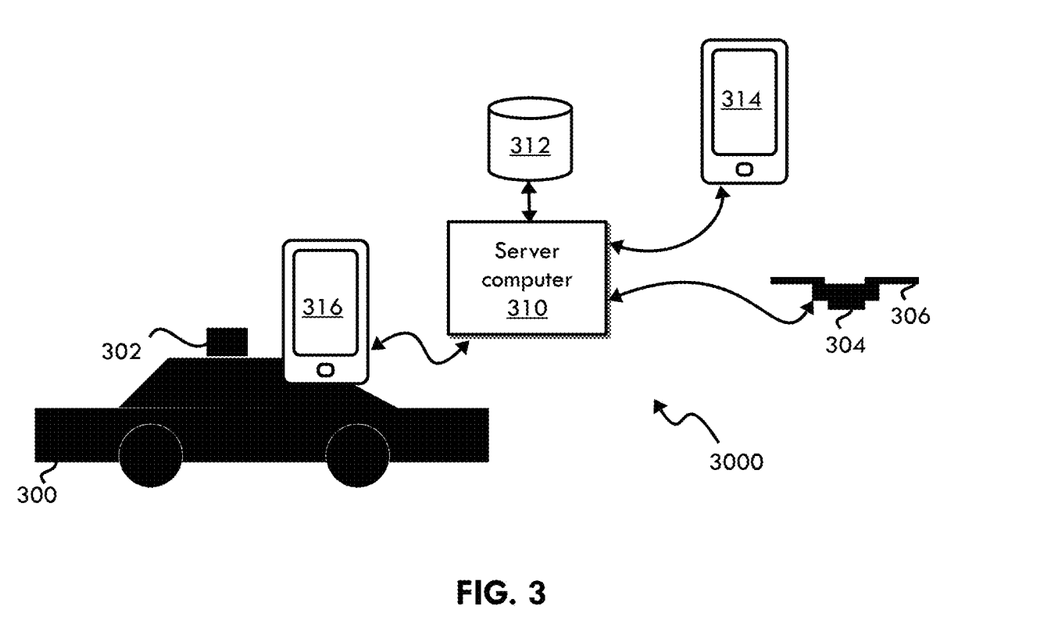
FIG. 3 is a schematic diagram of a system for transporting an unmanned vehicle according to a non-limiting embodiment.

Referring now to FIG. 3, a system 3000 for transporting an unmanned vehicle 306 is shown according to a non-limiting embodiment. The system 3000 includes a server computer 310 in communication with a computing device 316 associated with a ground vehicle 300, an unmanned vehicle 306, a data storage device 312, and a computing device 314 associated with the unmanned vehicle 306. The computing device 316 may be a mobile device operated by the vehicle 300 operator or, in other examples, may be an integrated vehicle computer arranged in the vehicle 300, a central dispatch computer associated with a plurality of vehicles, and/or the like. The unmanned vehicle 306 may include a ground vehicle or aerial vehicle that is operated remotely and/or autonomously, such as a drone. The unmanned vehicle 306 may be controlled by computing device 314 associated with the unmanned vehicle 306. The computing device 314 may include a mobile device, a server, a processor arranged in the unmanned vehicle 306 (e.g., on-board computer), and/or other system acting as a controller for the unmanned vehicle 306. The data storage device 312 may store one or more databases including locations, statuses, reservations, routes, and/or the like for one or more unmanned vehicles and/or ground vehicles.

With continued reference to FIG. 3, in non-limiting embodiments the server computer 310 may receive a transportation request from the computing device 314. The transportation request may include a current location and a destination location for the unmanned vehicle 306. The server computer 310 may then determine a ground vehicle 300 from a plurality of possible ground vehicles to transport the unmanned vehicle 306. For example, the server computer 310 may analyze real-time or near-real-time location data of ground vehicles stored in the data storage device 312 or received directly from a plurality of ground vehicles that have been registered with the server 310. The server computer 310 may also determine which ground vehicle is traveling to a location that is near or along the route to the destination location specified in the transportation request. As an example, the server computer 310 may poll a plurality of ground vehicles and/or associated computing devices within a predetermined distance or travel time to the current location of the unmanned vehicle.

Still referring to FIG. 3, the server computer 310 may automatically determine an available ground vehicle 300 or, in other examples, may generate and transmit a transportation request to the computing device 316 associated with the ground vehicle 300 that can be accepted or rejected. In some examples, multiple transportation requests may be transmitted to multiple computing devices associated with multiple ground vehicles, allowing for one of the ground vehicles to accept and/or for multiple ground vehicles to bid on accepting the request. In some non-limiting embodiments, the computing device 316 associated with the ground vehicle 300 responds to the transportation request with an acceptance message that accepts or rejects the transportation request. For example, the acceptance message may include one or more data packets including one or more fields for storing an indicator or other representation that the ground vehicle 300 is available for transporting the unmanned vehicle 306.

Once a ground vehicle 300 is identified, the server computer 310 controls the unmanned vehicle 306 to travel to the location of the ground vehicle 300. The server computer 310 may control the unmanned vehicle 306 in response to determining the ground vehicle 300 or, in other examples, may control the unmanned vehicle 306 in response to receiving an affirmative acceptance message. The server computer 310 may control the unmanned vehicle 306 by directly issuing commands to the unmanned vehicle 306 or by transmitting at least one command to the computing device 314 and/or unmanned vehicle 306 that cause the unmanned vehicle to travel to the location of the ground vehicle 300.

In non-limiting embodiments, the server computer 310 may also control an attachment mechanism 302, 304 arranged on the ground vehicle and/or unmanned vehicle 306 to attach and/or detach (e.g., couple and/or decouple) to the other. For example, and with reference to FIGS. 4A and 4B, the unmanned vehicle 306 may include an attachment mechanism 304 that corresponds to an attachment mechanism 302 arranged on the ground vehicle 300. It will be appreciated that one or more mechanisms may be used and that the mechanism(s) may be located on the ground vehicle 300, on the unmanned vehicle 306, or on both. In non-limiting embodiments, the attachment mechanism(s) may include one or more magnets, clasps, handles, platforms, interlocking members, hooks, suction cups, brackets, and/or the like. Although FIGS. 4A and 4B show the unmanned vehicle 306 attaching to a roof of the ground vehicle 300, it will be appreciated that the unmanned vehicle may attach to the ground vehicle 300 by attaching to the side, back, front, top, or bottom of the ground vehicle, to a trailer or platform connected to the ground vehicle, or to a carrier arranged anywhere on the vehicle.

Figure 4A:
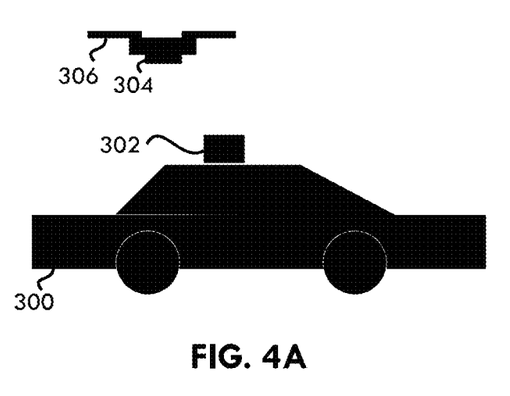
FIGS. 4A and 4B are further schematic diagrams of a system for transporting an unmanned vehicle according to a non-limiting embodiment.
Figure 4B:
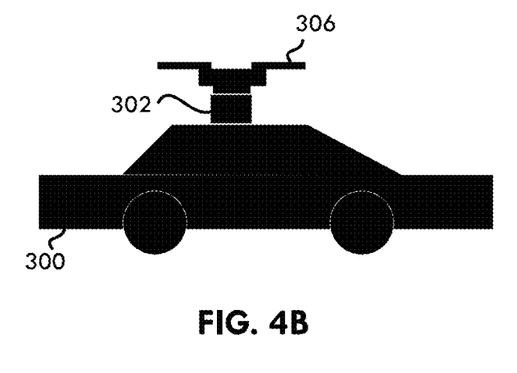

With continued reference to FIGS. 4A and 4B, a power connection on the ground vehicle 300 may supply power to the unmanned vehicle 306 while the unmanned vehicle 306 is attached to the ground vehicle 300. For example, the attachment mechanism 302 arranged on the ground vehicle 300 or another portion of the ground vehicle 300 may include a dock, port, or other type of wired or wireless connection to receive a power connection through the attachment mechanism 304 arranged on the unmanned vehicle 306 or another portion of the unmanned vehicle 306. The power connection may be contact-based or contactless. In this manner, a battery of the unmanned vehicle 306 may be charged while being transported by the ground vehicle 300.

Referring to FIG. 3, the location of the unmanned vehicle 306 may be monitored by a location device arranged on the unmanned vehicle 306 and/or a location device arranged on the ground vehicle 300. For example, the server computer 310, unmanned vehicle 306, ground vehicle 300, computing device 316, and/or computing device 314 may monitor the location of the unmanned vehicle 306 by receiving location data from a location device arranged on the unmanned vehicle 306 and/or ground vehicle 300. The location device may be a GPS device, mobile phone, or other suitable computing device capable of determining or receiving a location based on signal triangulation, GPS systems, wireless networks, and/or any other like methods.

It will be appreciated that the computing device 314 associated with the unmanned vehicle 306, another computing device, or any combination of computing devices may perform some or all of the actions described above as being performed by the server computer 310 in relation to FIG. 3. For example, in non-limiting embodiments in which the computing device 314 includes a processor arranged in the unmanned vehicle 306 (e.g., an on-board control system), the computing device 314 may determine the ground vehicle from the plurality of ground vehicles, transmit the transportation request to the computing device 316 associated with the ground vehicle 300, receive the acceptance message, control the unmanned vehicle 306, and/or control the at least one attachment mechanism 302, 304 to attach and detach from the ground vehicle 300.

Figure 5:
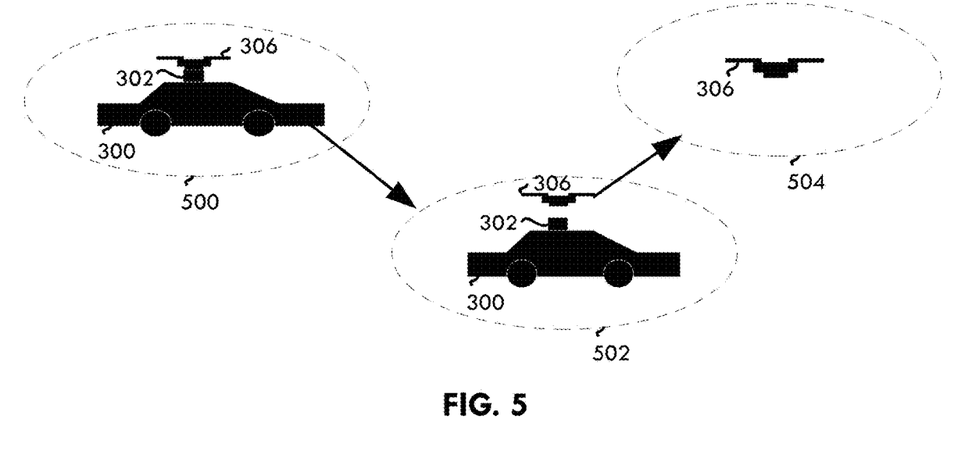
FIG. 5 is a further schematic diagram of a system for transporting an unmanned vehicle according to a non-limiting embodiment.

Referring now to FIG. 5, three locations 500, 502, 504 are shown according to a non-limiting embodiment. Each location 500, 502, 504 may be a specific location identified by coordinates or may be a region identified by a set of coordinates, a radius from a point, a set of boundaries (e.g., streets or landmarks), and/or the like. According to the example shown in FIG. 5, an unmanned vehicle 306 attaches to the ground vehicle 300 using a attachment mechanism 302. The ground vehicle 300 is traveling to a second location 502 based on a route and the unmanned vehicle 306 is traveling to a third location 504. The third location 504 may be a destination location for the unmanned vehicle 306, such as a delivery location, a base station, and/or the like. The ground vehicle 300 in this example may have been determined from a plurality of ground vehicles because the second location 502 is within a distance to the third location 504 (e.g., within range of the third location 504) such that the unmanned vehicle 306 can travel to the third location 504 with a threshold of battery power or signal connectivity. In response to arriving at the second location 502, the unmanned vehicle 306 automatically detaches from the ground vehicle 300 and travels to the third location 504. The second location 502 may be configured as a geo-fence such that entering the second location 502 triggers the unmanned vehicle 306 to detach. As described above, any device may monitor the location of the unmanned vehicle 306 and/or ground vehicle 300 to detect arrival at the second location 502 including, but not limited to, the unmanned vehicle 300, the ground vehicle 306, a remote computing device, and/or the like.

In non-limiting embodiments, and with continued reference to FIG. 5, the destination location 504 may be a delivery location or a base station for the unmanned vehicle 306. Accordingly, the ground vehicle 300 may transport the unmanned vehicle 306 toward a delivery destination or toward a base station destination (e.g., a delivery warehouse or service station). In non-limiting embodiments, a detection device such as a camera or other type of sensor (not shown in FIG. 5) may be arranged at the initial location 500, second location 502, and/or destination location 504 to visually monitor the location and to verify the attachment, detachment, delivery, and/or the like.

In non-limiting embodiments, an operator of the ground vehicle 300 may be compensated for transporting the unmanned vehicle 306. For example, each participant may have an account for transferring financial assets such that a value is transferred from an account associated with the unmanned vehicle 306 (e.g., a delivery company or the like) to an account associated with the ground vehicle 300 (e.g., the owner, driver, transportation company, or the like). The transfer may occur at any time and, in non-limiting embodiments, may be made in response to the unmanned vehicle 306 reaching a second location or its final destination. The cost (e.g., value of assets) transferred may be based upon the distance, the travel time, one or more bids submitted by operators of ground vehicles, and/or the like, and may be determined by users or automatically by a computing device.

In non-limiting embodiments, the ground vehicles include a plurality of delivery vehicles, such as delivery trucks, rideshare vehicles, taxi cabs, food delivery vehicles, and/or the like. The ground vehicles may also include private vehicles. Each ground vehicle may be associated with an account and may be registered with a server computer to participate. In some non-limiting embodiments, the ground vehicles may be associated with one or more planned routes. The ground vehicle for transporting a particular unmanned vehicle may therefore be determined based on one or more planned routes such that a destination of a route or a point along a route is within a threshold distance of a destination location of the unmanned vehicle. The routes may be predetermined for a time period for professional delivery vehicles or, in the case of rideshare, food delivery, and taxi cab vehicles, may be generated at intervals as routes are accepted by the ground vehicle operators.

Although FIGS. 3-5 depict the unmanned vehicle 306 as an aerial vehicle (e.g., such as a quad-copter drone), it will be appreciated that the unmanned vehicle 306 may be any type of aerial, ground, or water vehicle. For example, the unmanned vehicle 306 may be a ground drone that travels on streets and/or sidewalks for making deliveries. Further, the non-limiting embodiments in FIGS. 3-5 depict a single unmanned vehicle 306 on a ground vehicle 300 but it is also possible to attach a plurality of unmanned vehicles to a single ground vehicle. Moreover, in some non-limiting embodiments, an operator of the ground vehicle may physically move the unmanned vehicle into the ground vehicle or onto the ground vehicle such that an attachment mechanism is not used or is used manually. In such examples, instead of attaching to the ground vehicle, the computing device associated with the ground vehicle may guide the operator to the location of the unmanned vehicle for pick-up. Similarly, an operator of the ground vehicle may also physically deliver the unmanned vehicle to a designated location rather than the unmanned vehicle automatically detaching from the ground vehicle. The drop-off location may be, for example, a closer distance to a destination location for the unmanned vehicle. For example, a ground vehicle may pick up one or more unmanned vehicles from a location, drive to a second location, and then release the unmanned vehicles. Likewise, a ground vehicle may also pick up the same or different unmanned vehicles that were released and drive them to a base station. Various arrangements are possible.

In non-limiting embodiments, an unmanned vehicle may detach or be removed from an unmanned vehicle, travel to a destination location, and then return to the ground vehicle, a different ground vehicle, a base station, or another destination. One or more optimization algorithms may be utilized to optimize cost and/or energy by using one or more ground vehicles for all or a portion of a route of an unmanned vehicle.

Figure 6:
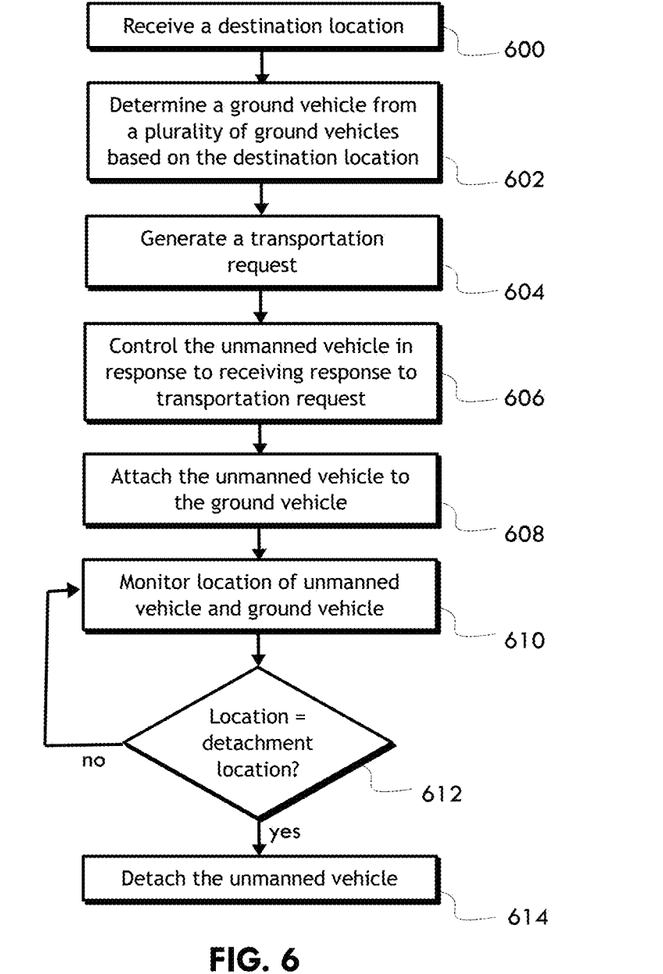
FIG. 6 is a flow diagram of a method for transporting an unmanned vehicle according to a non-limiting embodiment.

Referring now to FIG. 6, a flow diagram is shown for a method of transporting an unmanned vehicle according to a non-limiting embodiment. It will be appreciated that the steps in FIG. 6 may be performed by one or more computing devices including, but not limited to, a server computer, a computing device on-board an unmanned vehicle, a computing device on-board a ground vehicle, and/or the like. At a first step 600, a destination location for an unmanned vehicle is received. The destination location may be received from the unmanned vehicle, a server computer, or the like. Based on the destination location, at step 602 a ground vehicle is determined from a plurality of ground vehicles. For example, a ground vehicle may be identified from a plurality of ground vehicles based on which ground vehicle is closest to the unmanned vehicle and/or is traveling to a location that is closer to the destination location of the unmanned vehicle. Various other parameters may be considered in determining a ground vehicle, such as bids submitted by the ground vehicles, varying transportation costs, and/or the like.

With continued reference to FIG. 6, at step 604 a transportation request is generated. The transportation request may include one or more data packets including transportation parameters such as, for example, the destination location, a desired arrival time, and/or the like. The transportation request may be communicated to a computing device associated with the ground vehicle, such as a mobile phone operated by the driver of the ground vehicle, an on-board vehicle computer, and/or the like. The computing device may be enabled to accept or reject the transportation request by generating and communicating a response message. At step 606, in response to receiving an affirmative response message, the unmanned vehicle is controlled to the location of the ground vehicle. For example, a command may be generated by the unmanned vehicle or another computing device configured to cause the unmanned vehicle to travel to a first location associated with the ground vehicle.

Still referring to FIG. 6, at step 608 the unmanned vehicle is attached to the ground vehicle. For example, one or more attachment mechanisms arranged on the unmanned vehicle and/or ground vehicle may be controlled to couple the unmanned vehicle to the ground vehicle for transportation. At step 610, the location of the unmanned vehicle and/or ground vehicle is monitored after the vehicles are attached and are traveling together. At step 612, continually or at intervals, a determination is made whether a second location (e.g., a detachment location) has been reached. For example, one or more geo-fences may be utilized to detect the presence of the unmanned vehicle. Once the second location has been reached, the unmanned vehicle may be detached from the ground vehicle at step 614. If the destination location is different than the second location, the unmanned vehicle may travel to the destination location after detaching.

Figure 7:
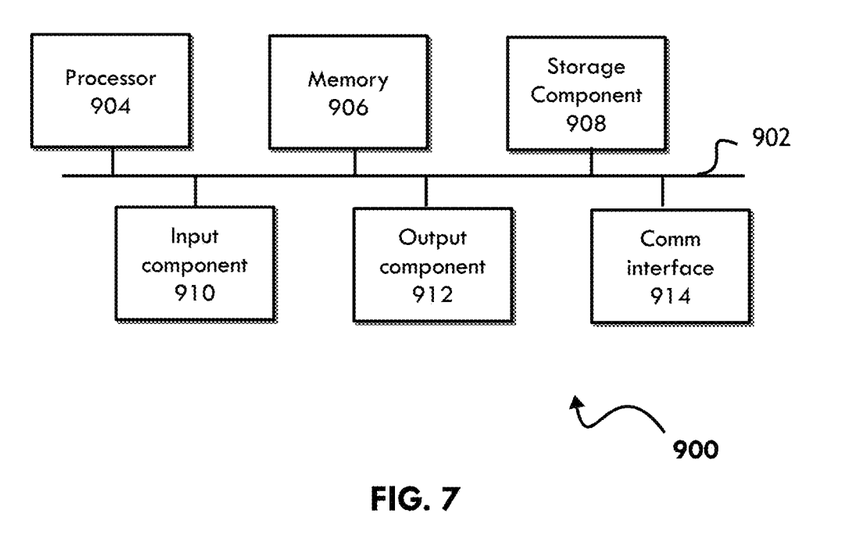
FIG. 7 illustrates example components of a device used in connection with non-limiting embodiments.

Referring now to FIG. 7, shown is a diagram of example components of a device 900 according to non-limiting embodiments. Device 900 may correspond to the server computer 100, computing device 104, server computer 310, computing device 314, computing device 316, unmanned vehicle 306, and/or ground vehicle 300 of FIGS. 1 and 3, as an example. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIGS. 1 and 3. Additionally, or alternatively, a set of components (e.g., one or more components) of device 900 may perform one or more functions described as being performed by another set of components of device 900.

As shown in FIG. 7, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 7, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for transporting an unmanned vehicle to a destination location, comprising:
   determining, with at least one processor, a subset of ground vehicles from a plurality of ground vehicles based on a location of the subset of ground vehicles, the destination location, and a location of the unmanned vehicle;
   transmitting a plurality of transportation requests to the subset of ground vehicles by transmitting a transportation request to each computing device of a plurality of computing devices, each computing device of the plurality of computing devices associated with a different ground vehicle of the subset of ground vehicles;
   receiving, from at least one computing device of the plurality of computing devices associated with the subset of ground vehicles, at least one acceptance message comprising a bid;
   identifying, with at least one processor, a ground vehicle of the subset of ground vehicles based on the at least one acceptance message;
   in response to identifying the ground vehicle, controlling, with at least one processor, the unmanned vehicle to the location of the ground vehicle;
   controlling, with at least one processor, at least one attachment mechanism to attach the unmanned vehicle to the ground vehicle;
   in response to the ground vehicle traveling to a second location, controlling, with at least one processor, the at least one attachment mechanism to detach the unmanned vehicle from the ground vehicle; and
   controlling, with at least one processor, the unmanned vehicle to the destination location.

2. The method of claim 1, wherein at least one processor arranged in the unmanned vehicle determines the ground vehicle from the plurality of ground vehicles, transmits the transportation request to the computing device associated with the ground vehicle, receives the acceptance message, controls the unmanned vehicle, and controls the at least one attachment mechanism.

3. The method of claim 1, wherein at least one processor of a remote server computer determines the ground vehicle from the plurality of ground vehicles, transmits the transportation request to the computing device associated with the ground vehicle, receives the acceptance message, and causes the unmanned vehicle to travel.

4. The method of claim 1, wherein the at least one attachment mechanism comprises a first mechanism arranged on the unmanned vehicle and a second mechanism arranged on the ground vehicle.

5. The method of claim 1, further comprising transferring at least one unit of credit from an electronic account associated with the unmanned vehicle to an electronic account associated with the ground vehicle in response to the ground vehicle traveling to the second location.

6. The method of claim 1, wherein the subset of ground vehicles is determined based on a planned route of each of the ground vehicles in the subset of ground vehicles.

7. The method of claim 1, wherein the subset of ground vehicles is determined based on a first distance of the unmanned vehicle.

8. The method of claim 1, wherein the attachment mechanism comprises at least one of a magnet and a physical locking arrangement.

9. The method of claim 1, wherein the unmanned vehicle comprises a first power connection and the ground vehicle comprises a second power connection, and wherein attaching the unmanned vehicle to the ground vehicle comprises establishing electrical communication between the first power connection and the second power connection.

10. A system for transporting an unmanned vehicle to a destination location, comprising at least one processor programmed or configured to:
    determine a subset of ground vehicles from a plurality of ground vehicles based on the location of the subset of ground vehicles, the destination location, and a location of the unmanned vehicle;
    transmit a plurality of transportation requests to the subset of ground vehicles by transmitting a transportation request to each computing device of a plurality of computing devices, each computing device of the plurality of computing devices associated with a different ground vehicle of the subset of ground vehicles;
    receive, from at least one computing device of the plurality of computing devices associated with the subset of ground vehicles, at least one acceptance message comprising a bid;
    identify a ground vehicle of the subset of ground vehicles based on the at least one acceptance message; and
    generate at least one command configured to cause the unmanned vehicle to travel to the location of the ground vehicle and attach to the ground vehicle.

11. The system of claim 10, further comprising a server computer including the at least one processor and arranged remotely from the unmanned vehicle and the plurality of ground vehicles, the at least one processor further programmed or configured to transmit the at least one command to the unmanned vehicle.

12. The system of claim 10, further comprising the unmanned vehicle, wherein the unmanned vehicle comprises the at least one processor.

13. The system of claim 10, further comprising at least one attachment mechanism arranged on at least one of the unmanned vehicle and the ground vehicle, the at least one attachment mechanism configured to attach the unmanned vehicle to the ground vehicle.

14. The system of claim 13, wherein the at least one attachment mechanism comprises a first mechanism arranged on the unmanned vehicle and a second mechanism arranged on the ground vehicle.

15. The system of claim 13, wherein the at least one attachment mechanism comprises at least one of a magnet and a physical locking arrangement.

16. The system of claim 10, wherein the at least one processor is further programmed or configured to:
    determine that the unmanned vehicle arrived at a second location; and
    in response to determining that the unmanned vehicle arrived at the second location, detach the unmanned vehicle from the ground vehicle.

17. The system of claim 10, wherein the subset of ground vehicles is determined based on at least one of the following: a planned route of each ground vehicle in the subset of ground vehicles, a distance between the unmanned vehicle and the subset of ground vehicles, or any combination thereof.

18. A computer program product for transporting an unmanned vehicle to a destination location, comprising at least one non-transitory computer-readable medium including program instructions that, when executed by at least one processor, cause the at least one processor to:
- determine a subset of ground vehicles from a plurality of ground vehicles based on a location of the subset of ground vehicles, the destination location, and a location of the unmanned vehicle;
- transmit a plurality of transportation requests to the subset of ground vehicles by transmitting a transportation request to each computing device of a plurality of computing devices, each computing device of the plurality of computing devices associated with a different ground vehicle of the plurality of ground vehicles;
- receive, from at least one computing device of the plurality of computing devices associated with the subset of ground vehicles, at least one acceptance message comprising a bid in response to the transportation request;
- identify a ground vehicle of the subset of ground vehicles based on the at least one acceptance message; and
- generate at least one command configured to cause the unmanned vehicle to travel to the location of the ground vehicle and attach to the ground vehicle.

* * * * *